Figure 1:
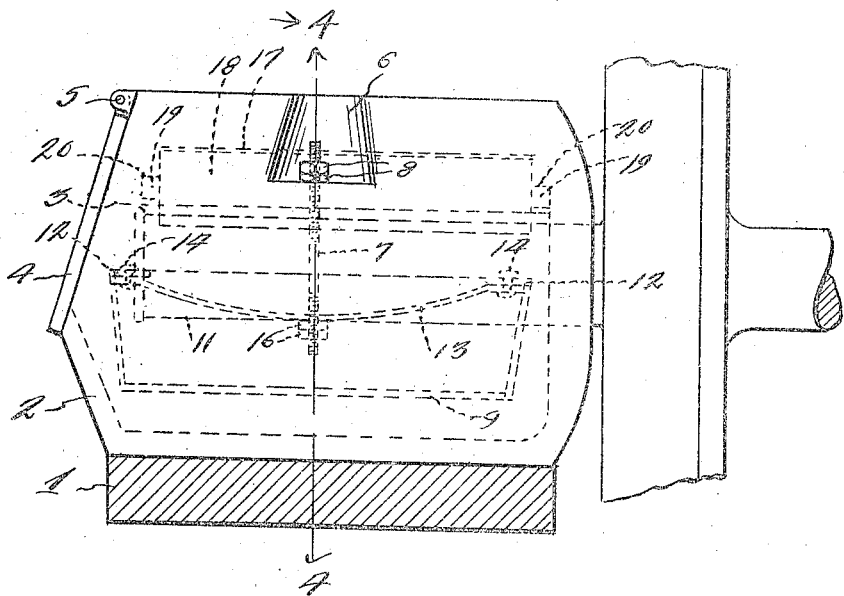

W. M. KING.
LUBRICATING FRICTION BOX.
APPLICATION FILED JUNE 1, 1916.

1,208,331.

Patented Dec. 12, 1916.
2 SHEETS—SHEET 1.

Inventor
W. M. King

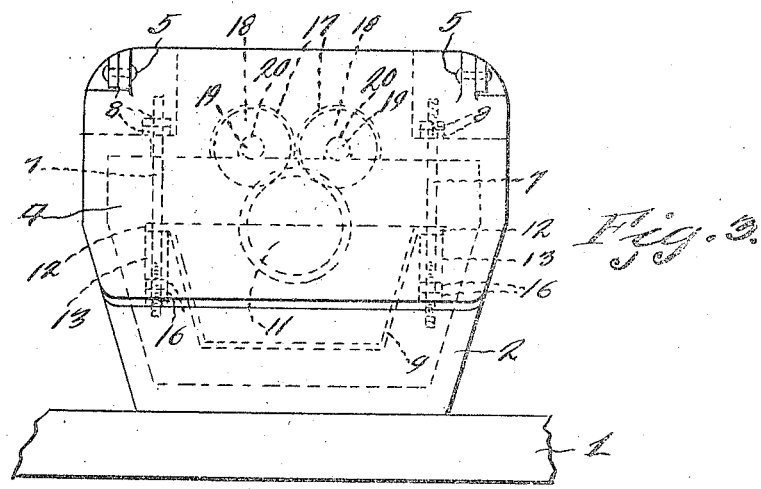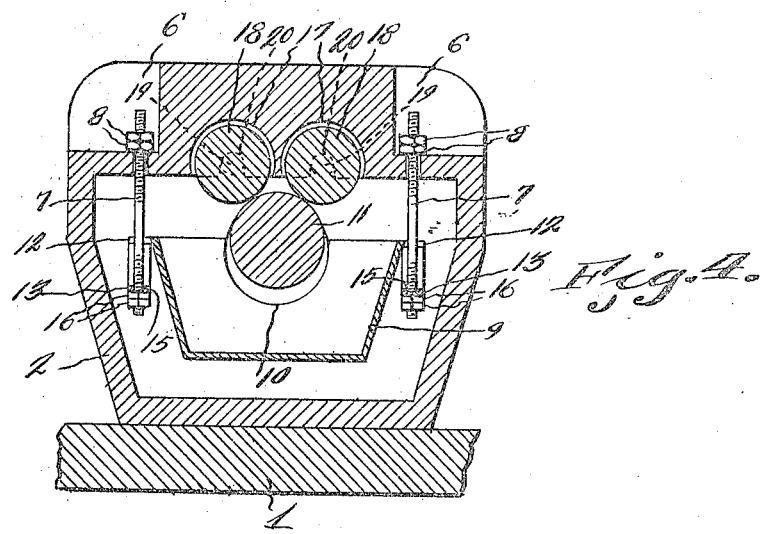

UNITED STATES PATENT OFFICE.

WILLIAM MARTIN KING, OF POINDEXTER, KENTUCKY.

LUBRICATING FRICTION-BOX.

1,208,331.

Specification of Letters Patent.

Patented Dec. 12, 1916.

Application filed June 1, 1916. Serial No. 101,081.

*To all whom it may concern:*

Be it known that I, WILLIAM M. KING, a citizen of the United States, residing at Poindexter, in the county of Harrison, State of Kentucky, have invented a new and useful Lubricating Friction-Box; and I do hereby declare the following to be a full, clear, and exact description of the invention, such as will enable others skilled in the art to which it appertains to make and use the same.

This invention relates to a new and useful lubricating bearing box for carwheel axles and an object of the invention is the provision of a bearing box of this kind provided with means to avoid friction.

A further object of the invention is to provide means for lubricating the axle spindle.

A further object of the invention is to provide a bearing box having a container yieldably supported therein, for holding waste and lubricant, for lubricating the spindle of the axle.

A further object of the invention is the provision of means for adjusting the container toward and from the axle spindle.

In practical fields the details of construction may necessitate alterations falling within the scope of what is claimed.

The invention comprises further features and combinations of parts as hereinafter set forth, shown in the drawings and claimed.

Figure 2:
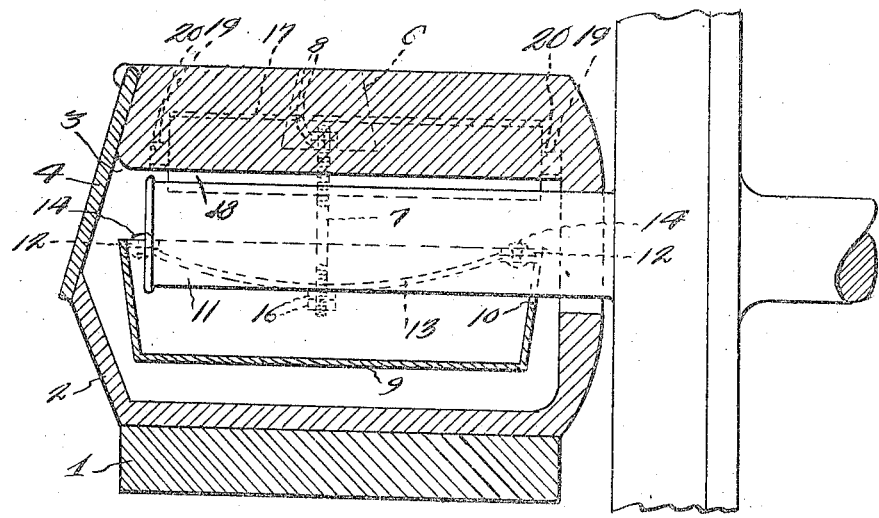

In the drawings, Figure 1 is a view in side elevation of the improved lubricating bearing box for car-wheel axles. Fig. 2 is a sectional view. Fig. 3 is an end view of the bearing box. Fig. 4 is a sectional view on line 4—4 of Fig. 1.

Referring more especially to the drawings, 1 designates a suitable support, on which the bearing box 2 is carried. This bearing box consists of a casing having one side open, as shown at 3, there being a closure 4 hinged at 5 for closing the opening. The opposite sides of the casing near its upper portion are provided with recesses 6, and extending downwardly through the upper wall of the casing adjoining the recesses 6 are threaded rods or bolts 7, there being nuts 8 upon the upper ends of the rods or bolts for adjustably suspending said rods. One of the nuts on each rod constitutes a lock nut. Arranged in the interior of the casing is a container or pan 9 for the reception of waste and lubricant. One end of this pan or container is provided with a semi-circular recess 10 for the reception of the axle spindle 11, whereby the same may rotate in contact with the waste, which is saturated with the lubricant. The opposite end portions of the container upon both sides are provided with ears 12, to which the ends of the bowed springs 13 are secured by means of bolts or rivets 14. The central portion of the bowed springs are provided with apertures 15, through which the lower threaded extremities of the bolts or rods 7 extend, and which lower extremities are provided with nuts 16. By setting up on the nuts, 8 or 16, the container may be moved toward the axle spindle and thereby hold the waste yieldably in contact therewith. The loosening of the nuts will allow the container to move downwardly, thereby decreasing the contact of the waste with the axle spindle. Formed in the under face of the top of the casing are two recesses 17 extending longitudinally. These recesses are partially circular in cross section and receive the anti-friction rollers 18, the pintles 19 of which are mounted in the bearings 20 at the ends of the recesses 17. The anti-frictional rollers 18 act as bearings for the axle spindle, as shown clearly in Fig. 4.

The invention having been set forth, what is claimed as new and useful is:—

1. In a lubricating bearing box, the combination of a casing and a waste and lubricant container on the interior thereof, of means for yieldably supporting said container, said means comprising bowed springs carried by the opposite side of the container, and adjustable rods carried by the upper wall of the casing adjustably connected to the bowed springs, for increasing or decreasing the tension of the springs of the container.

2. In a lubricating bearing box, the combination of a casing having its upper wall provided with movable bearings and a waste and lubricant container on the interior of said casing, an axle spindle, one end wall of said container having a semi-circular recess to receive an axle spindle, whereby the waste and lubricant may be in contact with the spindle, of means for yieldably supporting said container, said means comprising bowed springs carried by the opposite longitudinal side of the container, said springs being bowed downwardly, adjustable rods carried by the upper wall of the casing, adjustably connected to the bowed springs, for increasing or decreasing the tension of the springs, whereby the waste and lubricant in said container may bear upon the axle spindle and hold the same in contact with the movable bearings.

In testimony whereof I have signed my name to this specification in the presence of two subscribing witnesses.

WILLIAM MARTIN KING.

Witnesses:
E. F. MASON,
JAMES S. GREEN.